(12) United States Patent
Bendavid

(10) Patent No.: US 12,124,643 B2
(45) Date of Patent: Oct. 22, 2024

(54) MOUSE INPUT FUNCTION FOR PEN-SHAPED WRITING, READING OR POINTING DEVICES

(71) Applicant: Microsoft Technology Licensing, LLC, Redmond, WA (US)

(72) Inventor: Yoram Bendavid, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/464,195

(22) Filed: Sep. 8, 2023

(65) Prior Publication Data

US 2023/0418397 A1    Dec. 28, 2023

Related U.S. Application Data

(63) Continuation of application No. 17/775,608, filed as application No. PCT/US2020/058078 on Oct. 30, 2020, now Pat. No. 11,782,536.

(30) Foreign Application Priority Data

Nov. 15, 2019  (EP) ..................................... 19209392

(51) Int. Cl.
   *G06F 3/038*     (2013.01)
   *G06F 3/03*      (2006.01)
   *G06F 3/0346*    (2013.01)
   *G06F 3/0354*    (2013.01)

(52) U.S. Cl.
   CPC .......... *G06F 3/0383* (2013.01); *G06F 3/0304* (2013.01); *G06F 3/0346* (2013.01); *G06F 3/03543* (2013.01); *G06F 3/03545* (2013.01)

(58) Field of Classification Search
   CPC ............. G06F 3/03545; G06F 3/03543; G06F 3/03544; G06F 3/03541; G06F 3/0354; G06F 3/033; G06F 3/0346; G06F 3/044; G06F 3/0386; G06F 3/03542
   USPC ...................... 345/156, 163, 179; 178/18.01, 178/19.03–19.05
   See application file for complete search history.

(56) References Cited

U.S. PATENT DOCUMENTS 7,030,864 B2 *  4/2006  Yueh ..................... G06F 3/0312
                                                345/184
8,310,447 B2 * 11/2012  Peterson ............. G06F 3/03545
                                                345/169

FOREIGN PATENT DOCUMENTS

CN       105718079 A     6/2016
CN       103970305 A     4/2017

OTHER PUBLICATIONS

Communication pursuant to Article 94(3) received in European Application No. 20808606.6, mailed on Jun. 5, 2024, 5 pages.
(Continued)

*Primary Examiner* — Koosha Sharifi-Tafreshi
(74) *Attorney, Agent, or Firm* — Barta Jones, PLLC

(57) ABSTRACT

An apparatus and method for providing a structure and function to a pen-type handheld writing, reading or pointing device to enable usage of the device to perform operations similar to a computer mouse for a computing device. The structure includes an optical sensor, a portion of the optical sensor surface that can perform operations of a clickable button, and a structure to support a connection to the computing device.

20 Claims, 3 Drawing Sheets

(56) References Cited

OTHER PUBLICATIONS

Office Action Received for Chinese Application No. 202080079311.5, mailed on Apr. 15, 2024, 14 pages (English Translation Provided).

* cited by examiner

MOUSE INPUT FUNCTION FOR PEN-SHAPED WRITING, READING OR POINTING DEVICES

BACKGROUND

A pen or stylus is known in the art for use with touch-enabled computing devices (i.e. host devices). The writing tip of the stylus interacts with a touch-screen of the host device. It is detected by a digitizer sensor when electrostatic or capacitive coupling is established between the writing tip and a portion of a matrix of electrode junctions of the digitizer sensor. The coupling is a result of proximity of the writing tip to the digitizer sensor. Positions of the writing tip over the screen are correlated with virtual information portrayed on the touchscreen.

Known styli are limited in their functionality. At times positioning the stylus over the touch-screen may obstruct the user's view. In addition, cursor control based on moving the writing tip over the touch-screen may be limited due to size of the screen and resolution of the digitizer sensor. Often, users prefer to bring their wireless mouse with them instead of using a laptop touch pad.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

The disclosure in some embodiments relates to a stylus comprising a writing tip configured to provide input to a host device by touching and hovering over a touch-screen of the host device; and an apparatus for providing a mouse-type input functionality to a pen-type device, the apparatus comprising an integrated optical mouse unit for surface movement detection, a surface detecting zone, and a pressure sensing element for sensing a pressure or force applied to the surface detecting zone to detect a mouse click action, wherein the apparatus is configured to switch the stylus from a stylus operating mode to a mouse operating mode in response to an output from an orientation sensing device, and wherein the optical mouse unit is arranged at a back-end portion or a cap of the stylus. Thereby, a stylus can be used to perform operations similar to a computer mouse. As at least a part of the optical mouse unit is moveable and acts as a button for mouse click input, no further mouse buttons are required on the surface of the stylus. Moreover, using separate buttons on a stylus may lead to an inconvenient handling by the user. Pressing the whole stylus towards the surface of the underlying plane via the optical mouse unit allows a very convenient and intuitive use of the mouse function in the stylus.

Through the present disclosure, a pen-type device may be any handheld pen-shaped writing, reading and/or pointing device (such as an active or passive stylus, an ink pen, a pan-shaped scanner, a laser pointer etc.).

According to another aspect, a method of providing a mouse-type input functionality to a stylus comprises providing input to a host device based on a writing tip touching and hovering over a touch-screen of the host device, sensing a surface movement at a surface detecting zone of the stylus, sensing a pressure or force applied to the surface detecting zone, triggering a mouse click function in response to the pressure or force sensing, and switching the stylus from a stylus operating mode to a mouse operating mode in response to an output from an orientation sensing device.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which.

DETAILED DESCRIPTION OF EMBODIMENTS

Figure 1:
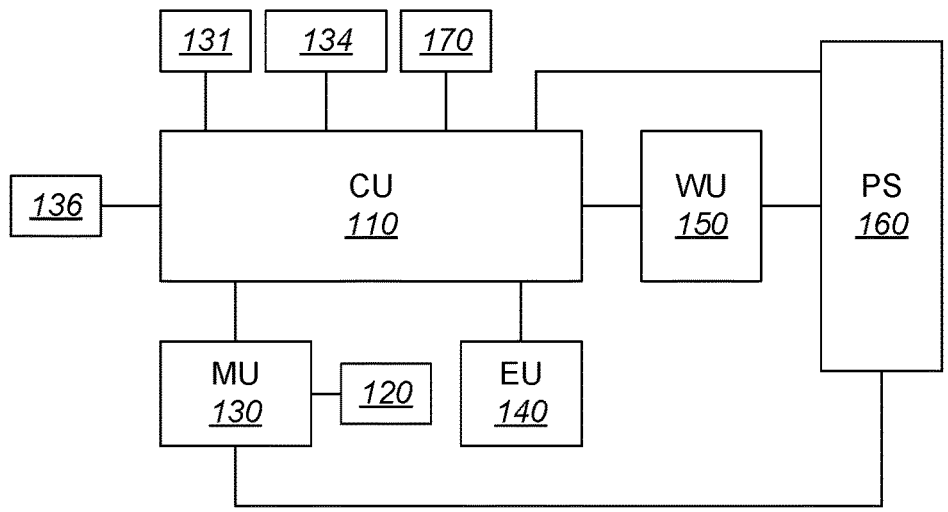
FIG. 1 is a schematic block diagram of an example stylus with an integrated mouse function.

The present disclosure is directed to an implementation of a computer mouse function in pen-type devices, such as a stylus for a touch-sensitive display, an ink pen, a pencil, a pen-shaped scanner device, a laser pointer or the like.

A hand-held stylus peripheral ("stylus") for use with electronic devices, including smart phones, tablets, watches, desktop computers, gaming devices, wearable device, televisions, video conferencing systems, etc. may be used to communicate user input to an electronic device ("host device"). Some host devices include a display with a built-in digitizer to sense signals transmitted from the stylus (e.g., an "active stylus"). In these electronic devices, a user interacts with the digitizer system by positioning and moving the stylus over a sensing surface of the system, e.g., a tablet and/or a touch screen. The position of the stylus with respect to the sensing surface is tracked by the digitizer system and interpreted as a user command. In some technologies, the position of the stylus can be determined based on detection of capacitive coupling between an electrode of the stylus and one or more electrodes of the digitizer. For example, the device display may include a digitizer with a plurality of X and Y oriented conductors or a resistive film to receive signals transmitted from the electrode of the active pen. To accurately identify a tip position, the transmitting electrode is, in some technologies, physically positioned within a writing tip of the stylus.

A stylus can be classified as a passive stylus or an active stylus. The passive stylus utilizes sensing methods based on changes in the capacitive coupling between sensor electrodes deposited on a touch-screen sensor and an input object, such as a rubber-tipped stylus or figure. In contrast, the active stylus drives unique modulated signals between the tip of the stylus and a grid or matrix of electrodes of the touch-screen sensor (e.g., a digitizer system) and utilizes sensing methods based on changes in the capacitive coupling between sensor electrodes. The digitizer system detects at least one position of the stylus based on the signal emitted and the detected position provides input to the host device (e.g. a computing device) associated with the digitizer system. The detected position may then be interpreted as user commands. Often, the digitizer system is integrated with a display screen, e.g., to form a touch-sensitive display device.

Using a laptop touch pad for controlling a cursor on the display screen may neither be intuitive nor convenient for a user. Therefore, users often prefer to bring their wireless mouse in their pocket with them to meetings, although they may have a stylus attached to their laptop.

In some embodiments, a mouse functionality is incorporated as part of an active or passive stylus, that can be both easy to produce and convenient for the user to use as a "two-in-one" product. It is much more intuitive than the touch pad and much easier to use. No extra device is needed and the pen-shaped stylus or another pen-type device may include the capability to provide input similar to a computer mouse when the stylus is positioned relative to a surface so that a part of an outer surface of the housing of the stylus is close to the surface. The stylus may include an optical mouse unit with an optical emitter and detector on a side of the stylus to allow position tracking and a communication unit for wireless communication with the host device.

FIG. 1 is a schematic block diagram of an example stylus with an integrated mouse function. The simplified block diagram of FIG. 1 shows an example optical mouse unit (MU) 130 with an optical sensor, which can be enhanced by optional additional button(s) 131 and an optional scroll function. In examples, the stylus may optionally include a capacitive sensing strip 134 integrated along a length of the housing of the stylus that can be operated by a user's finger to provide a scroll command by sliding a finger along the capacitive sensing strip 134. Optionally, an eraser unit (EU) 140 may be provided for erasing digital ink and highlighting from a page displayed on a touchscreen of the host device, e.g. by dragging an erasure portion of the stylus across the ink that shall be erased. As a further option, the stylus may include an orientation sensing device 170 (e.g. a gyroscope) for detecting an orientation of the stylus with in a two- or three-dimensional space.

The mouse unit 130 with the optical sensor may be integrated on a portion of the housing of the stylus that is tapered or inclined towards an elongated cylindrical middle portion of the stylus. Optionally, in this orientation, the optical mouse unit 130 may be operated while a user is holding the stylus in a typical writing position. Alternatively, the optical mouse unit 130 may be integrated along a portion of the housing that is not tapered and only operable while the stylus is lying flat against a surface.

The stylus may optionally include one or two user manipulated buttons 131 that may provide e.g. mouse right click and mouse left click functionality. The optical mouse unit 130, optional button(s) 131 and the optional sensing strip 134 may be controlled by a control unit 110 (e.g. implemented in a system on chip (SOC), application specific integrated circuit (ASIC), micro-processing unit, etc.). A wireless communication unit (WU) 150 may be used to transmit control information to a computing device (host device) based on commands sensed with the optical mouse unit 130, optional button(s) 131 and optional sensing strip 134.

Furthermore, the operation of the optical mouse unit 130, button(s) 131, strip 134 and wireless communication unit 150 may be powered by a power source (PS) 160 of the stylus. Optionally, the power source 160 may be a rechargeable battery.

In embodiments, the stylus is configured to provide input to a host device (not shown) based on a writing tip 136 touching and hovering over a touch-screen of the host device and is further configured to provide input to the host device based on a user actuating a pressure sensor (button sensor) 120 via the optical mouse unit (MU) 130 integrated on the housing of the stylus. The additional input provided by the pressure sensor 120 improves the functionality of the stylus when operated in mouse operating mode for controlling a cursor displayed on the touch-screen (mouse-type input function) and may also provide additional functionality.

A plane surface area on the stylus may enclose the optical mouse unit 130 that may also act as a click button (e.g. double click mouse button), meaning that when a user reaches a desired position with the mouse unit 130, he/she does not have to double-click a separate button. Rather, the double-click or a single-click operation can be achieved by applying a force or pressure via the whole stylus over a clickable optical surface of the mouse unit 130 which will be designed as a pressable surface with button detectable capabilities. The pressure or force applied to the pressable surface of the mouse unit 130 is detected by the pressure sensor 120.

In examples, the optical mouse unit 130 may be implemented by miniaturizing mechanical, optical and/or electrical core elements of a conventional computer mouse and combining these with existing mechanical and/or electrical elements of the stylus. As an example, most of the current hardware elements of the stylus can remain untouched, while some elements may be reused in a different way so that the stylus can act as a mouse. What can be reused may be at least one of the power supply unit ((rechargeable) battery) 160, the wireless communication unit 150, current stylus buttons 131, the eraser unit 140, various stylus sensors (e.g. tip sensor, ring sensor, pressure sensor). New added elements may be at least one of the optical mouse unit 130 with light emitting element (e.g. LED) and light detecting element (e.g. photocell), mouse button sensor (pressure sensor), and contact element(s) for embodiments where the optical mouse unit 130 is provided in a detachable part (e.g. tip unit or cap) of the stylus or other pen-type device.

In examples, the whole optical mouse unit 130 can be arrange in a tiny hole and may comprise a light emitting element (e.g. a light emitting diode (LED)) that emits e.g. blue or red light. The surface area of the optical mouse unit 130 may be inclined at a predetermined angle at the front or back end of the stylus or a cap or a tip unit thereof and can be surrounded by a thin plastic button ring which is in contact with the stylus surface on one side and with the cap or stylus body on the other side. The ring button may surmount the cap or stylus surface by a very slight height (e.g. <1 mm), in order to act as a click button. This button ring may act as a click button when pressing the whole cap or stylus over it and is connected to the pressure sensor 120. Thereby, no further buttons are required for incorporating the mouse function to the stylus or other pen-type device.

In examples, the pressure sensor 120 may act as main button sensor of the stylus which detects other buttons in a stylus operating mode or the ring button in a mouse operating mode.

In examples, the ring button of the optical mouse unit 130 may have a mechanical acoustic click feedback like conventional click buttons on conventional mouse devices or other input devices.

In examples, the activation of the mouse click button at the optical mouse unit 130 may be decoded by the control unit 110 of the stylus according to at least one of the following rules:
- 1 ring button fast double click/press=left mouse button double click;
- 1 ring button short (fast) click/press=left mouse button click;
- 1 ring button long click/press=right mouse button click;
- Click and move the pen simultaneously=drag operation.

In examples, the whole optical mouse unit 130 may be configured as a moveable button or the button may be arranged close to the optical mouse unit 130 so that it can be activated by pressing the stylus with the fingers of a user towards the underlying surface via the optical mouse unit 130.

In other examples, a premium stylus or regular pen or pen-shaped scanner device may have a special cap (as of regular ink pens) which may be modified to include the optical mouse unit 130 and optionally also the eraser unit 140, as explained later in more detail with reference to FIGS. 5 to 7. Such a modified cap could be sold separately as an add-on to a stylus, a regular pen or other pen-shaped writing, reading or pointing devices.

According to some example embodiments, a user may seamless switch between using the writing tip 136 over a touch-screen to provide input via the electrostatic channel and using an optical sensor of the optical mouse unit 130 over another surface to provide mouse-type input via an alternate wireless channel implemented by the wireless communication unit (WU) 150. In examples, if the mouse unit 130 is implemented at the tail of the stylus, the stylus may for example automatically switch to mouse mode when it is turned upside down from tip side to tail side. If the mouse unit 130 is implemented in a cap of the stylus, the stylus may for example automatically switch to mouse mode e.g. when a connecting portion of the cap top is connected to a contact ring or other contact portion at the stylus body. If the mouse unit 130 is implemented as a removable tip head unit of the stylus, the stylus may for example automatically switch to mouse mode when an adequate pen head is connected to the stylus body.

The control unit 110 in the stylus may receive various control information from button sensor(s), writing tip 136, mouse unit 130 etc., which may be transmitted by an electrostatic channel while the writing tip 136 of the stylus is positioned on the touch-screen in the stylus operating mode and which may be transmitted by a wireless channel via the wireless communication unit 150 while the stylus is displaced from the touch-screen and operates in the mouse operating mode.

Figure 2:
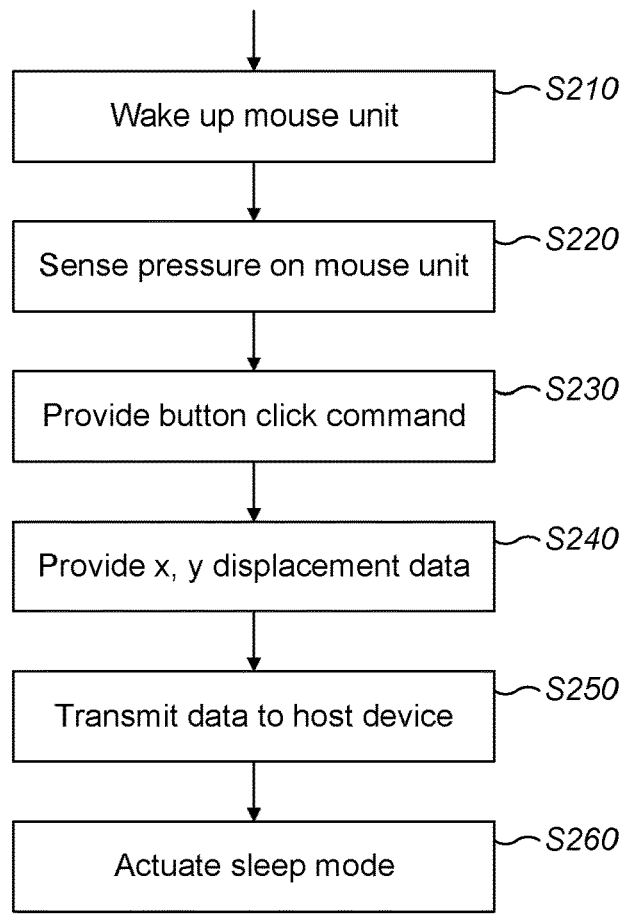
FIG. 2 is a simplified flow chart of an example method for operating a pen-type device with optical mouse unit.

Reference is now made to FIG. 2 showing a simplified flow chart of an example method for operating a pen-type device with an optical mouse unit. The optical mouse unit, e.g. mouse unit 130 in FIG. 1, may be selectively activated by a controller, e.g. control unit 110 in FIG. 1, and a wakeup command by the controller may initiate activation of the optical mouse unit (block S210). The optical mouse unit may be maintained in a sleep mode while the pen-type device is paired with a touch-screen of a host device and may be activated e.g. based on sensing a break in the pairing, an activation of a mouse button or mouse select button, a change of the orientation of the pen-type device, etc.

A pressure of the pen-type device against the surface of the optical mouse unit may be sensed by the pressure sensor (block S220) and based thereon, a corresponding button click command may be provided to the controller (block S230). Based on sensed data of the optical mouse unit, X-Y displacement commands are determined and provided to the controller (block S240). The button click commands and X-Y displacement commands may then be transmitted by wired or wireless transmission (block S250) to the host device. Finally, mouse tracking with the optical sensor may be selectively turned off by the controller (block S260).

The operations of FIG. 2 may be continuously or intermittently repeated. In some implementations, the commands of block S250 may be communicated to the host device via Bluetooth, Wi-Fi, NFC etc.

Figure 3A:
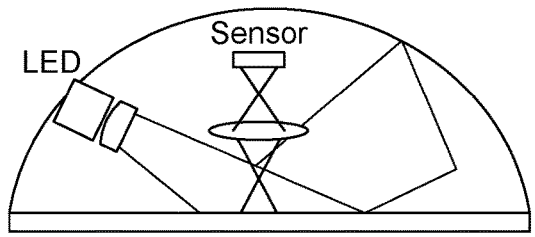
FIGS. 3A and 3B are schematic drawings indicating example optical systems of a mouse unit.
Figure 3B:
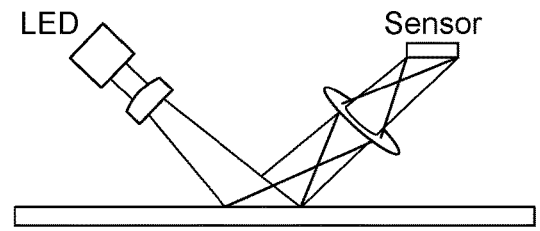

FIGS. 3A and 3B are schematic drawings indicating example optical systems of an optical mouse unit that can be used in some embodiments. More specifically, FIG. 3A shows a traditional optical system with detection of scattered light, while FIG. 3B shows a specular optical system where specular reflection (also known as regular or mirror-like reflection) of waves, such as light, from a surface is applied.

In embodiments, the optical mouse unit may comprise a light emitting diode (LED) that emits a light through an optical window. Light emitted by the LED may be reflected or scattered from a surface, e.g. table top back, through the optical window and captured by an image sensor. Optionally, the image sensor may be associated with optics. A processor (e.g. the control unit 110 of FIG. 1 or a separate processor provided in the optical mouse unit 130 of FIG. 1) may compare a series of images to detect movement of the optical window.

In some example embodiments, the optical mouse unit may include a first image sensor positioned and oriented to capture images while the stylus is being held in a writing position and may include a second image sensor positioned and oriented to capture images while the stylus is positioned flat against a surface. The processor may detect images captured from each of the image sensors and select data from the image sensor that provides the best results.

Optionally, the processor may select one of the two image sensors to actuate for tracking based on input received from the orientation sensing device 170. In embodiments, the orientation sensing device 170 may as well be used for switching between the stylus operating mode and the mouse operating mode based on an orientation of the stylus.

In the optical systems of FIGS. 3A and 3B, the optical sensor may sense movement of the stylus or other pen-type device along a surface (other than the touch-screen of a host device), e.g., a top of a table or a surface on a (laptop) computer. In some example embodiments, the optical sensor may be oriented and configured to track a user's hand moving the stylus while the stylus is positioned horizontally on the surface or while the stylus is held in a writing position. The optical sensor may be operated in the same or a similar manner as a conventional optical mouse and may detect a two-dimensional movement on the surface and transmit displacement data as an input to the host device via a wired or wireless communication channel based on the movement sensed. The input to the host device may control the position of a cursor on a touch-screen of the host device without direct interaction between the stylus and the touch-screen and may also be used to provided electronic inking.

In some example embodiments, inking with the optical sensor of the mouse unit may be performed with a higher resolution as compared to inking based on the electrostatic interface with the touch-screen.

The communication with the host device (e.g. by the wireless communication unit 150 of FIG. 1) may for example be achieved over a wireless connection (e.g. Bluetooth Low Energy (BLE), near-field communication (NFC), other radio frequency (RF) or wireless communication).

Figure 4:
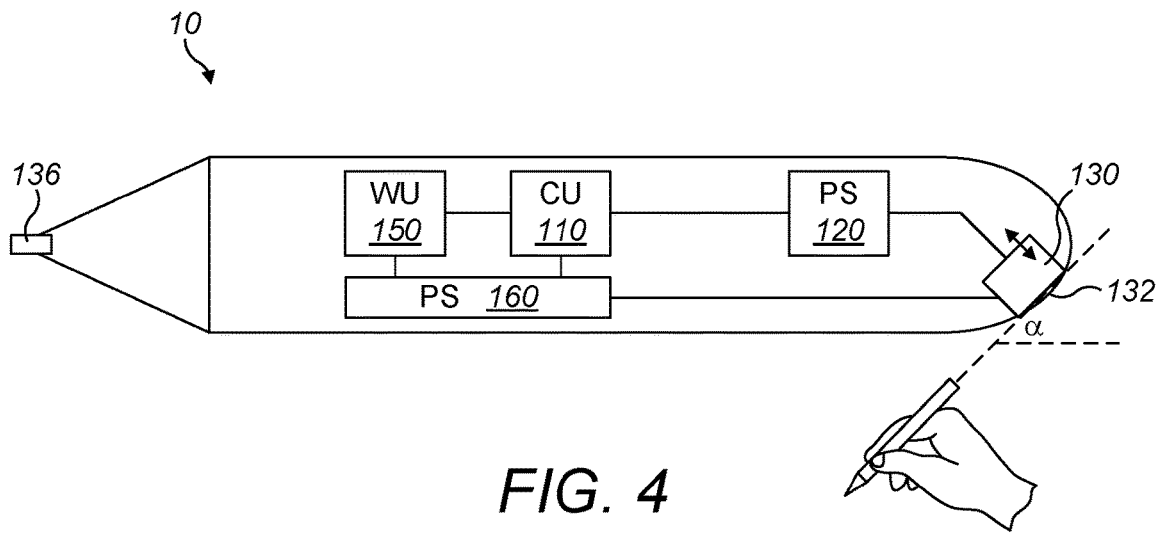
FIG. 4 is a schematic block diagram of an example stylus with integrated mouse function.

FIG. 4 is a schematic block diagram of an example stylus 10 with writing tip 136 for use in stylus operation mode and integrated optical mouse unit 130 with mouse click pressure sensor 120 for use in a mouse operating mode. The optical mouse unit 130 can be placed at the back portion of the stylus 10 opposite to the tip portion at the front of the stylus 10. Note that only those components of the stylus 10 are shown in FIG. 4 which are useful for explaining embodiments. Other components have been omitted for simplicity reasons.

The stylus 10 further comprises a control unit (CU) 110, a wireless communication unit (WU) 150 which is configured to communicate with a host device (not shown) via Bluetooth, Wi-Fi, near-field communication (NFC), etc. The wireless communication unit 150 may include a receiver to receive communication commands, pairing requests, etc. from a wireless communication unit at the host device. The stylus 10 further comprises a power supply unit (PS) 160, which may comprise a battery for powering various components of the stylus 10, such as the wireless communication unit 150, the control unit 110 and the optical mouse unit 130. The battery may be rechargeable, replaceable, disposable, etc.

In some examples, the stylus 10 may additionally or alternatively be wired to the host device 20 by, for example, a Universal Serial Bus (USB) connection and communicates with the host device via such a connection.

Note that all examples, options and embodiments described in connection with similar components shown in FIG. 1 also apply to the components of FIG. 4 and those of the subsequent FIGS. 5 to 8.

As indicated in FIG. 4, the optical mouse unit 130 is integrated in an inclined portion of the surface of the housing of the stylus 10 at a predetermined angle D with respect to the non-inclined cylindrical side surface of the stylus 10. The predetermined angle Q may be selected so that a clickable upper surface region 132 of the optical mouse unit 130 is arranged parallel to the surface of an underlying plane when a user holds the stylus in a usual writing manner (as schematically indicated by a user's hand with a pen device in the lower right portion of FIG. 4) with the back end facing downwards. Thereby, it can be ensured that the mouse function of the stylus can be used in a convenient and intuitive manner by holding the stylus 10 as a usual writing pen with an opposite orientation. A mouse click may then simply be activated by pressing the movable optical mouse unit 130 with its integrated click button towards the underlying surface. This pressure is then detected by the pressure sensor 120 and a corresponding click command is signalled to the control unit 110. Additionally, X-Y displacement data or commands for controlling a cursor on the display of the host device are signalled to the control unit 110 via a corresponding signalling connection.

In examples, further mouse button(s) and a strip electrode for a mouse scroll function may be provided on the stylus.

In other embodiments, the moveable optical mouse unit 130 with or without integrated click button function may be integrated in a detachable part (e.g. cap or tip unit) of a stylus or any other pen-type device. The detachable part may comprise a mounting mechanism (e.g. insertion, fitting, fastening, engaging, and/or snapping mechanism) for detachably mounting or connecting the detachable part to the pen-type device in order to provide a convenient and intuitive mouse input function.

Figure 5:
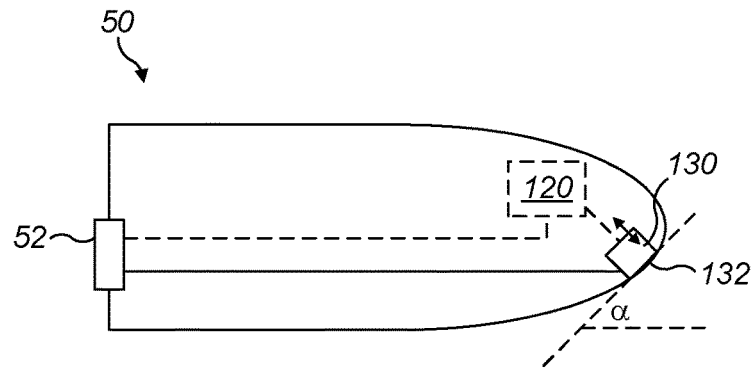
FIG. 5 is a schematic block diagram of an example cap with integrated optical mouse unit.

FIG. 5 is a schematic block diagram of an example cap 50 with integrated optical mouse unit 130 for an active stylus (not shown). The cap 50 can be detachably mounted to the front end and/or back end of the stylus and can be electrically connected to the internal components (e.g. control unit, power supply unit, wireless communication unit) of the stylus via a connecting portion 52 (e.g. an electrically conductive ring or patch or the like). The connection portion 52 may include the mounting mechanism for detachable mounting and may comprise several separated elements for respective different connections to different internal components of the stylus. The stylus may already include a battery/charging mechanism, a communication unit, a controller, a pressure sensor (may be for additional or all mouse buttons controls), which can be shared with the mouse function in a mouse operating mode.

In embodiments, the optical mouse unit 130 may be movable and may comprise an integrated button click functionality. Then, an additional pressure sensor 120 may be provided for detecting a mouse click. In alternative embodiments, buttons on the stylus housing may be shared for mouse click operations or a pressure sensor in the stylus may be shared for sensing a mouse click via the optical mouse unit 130.

Similar to FIG. 4, the optical mouse unit 130 can be integrated in an inclined portion of the surface of the housing of the cap 50 at a predetermined angle Q with respect to the non-inclined cylindrical side surface of the cap 50. The predetermined angle Q may be selected so that a clickable upper surface region 132 of the optical mouse unit 130 is arranged parallel to the surface of an underlying plane when a user holds the stylus with the attached cap 50 in a usual writing manner.

Thus, a convenient and intuitive mouse function can be incorporated in a cap of a stylus without requiring additional mouse click buttons.

Figure 6:
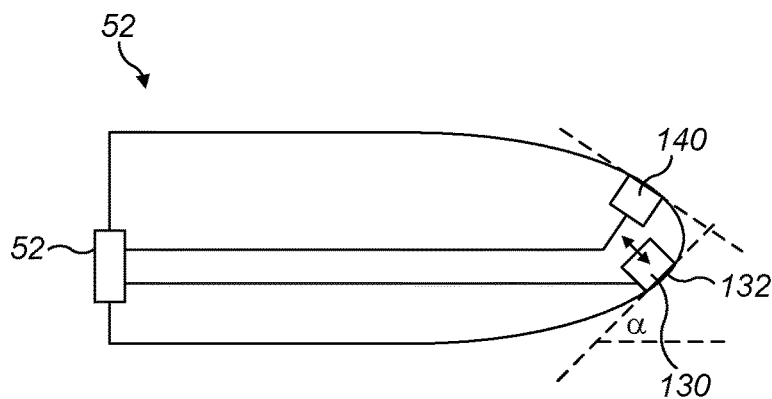
FIG. 6 is a schematic block diagram of an example cap with integrated optical mouse unit and stylus eraser unit.

FIG. 6 is a schematic block diagram of an example cap 52 with integrated optical mouse unit 130 and additional stylus eraser unit 140.

The embodiment of FIG. 6 corresponds to the embodiment of FIG. 5 with the exception that the additional eraser unit 140 is provided. Therefore, the above description of the cap 50 of FIG. 5 also applies to the cap 52 of FIG. 6.

The additional eraser unit 140 is also connected via the connecting portion 52 to the stylus. When the stylus is set into an eraser mode, the eraser unit 140 can be brought near to the touchscreen of the host device in order to perform an erasing operation.

In embodiments where the eraser unit 140 is placed opposite to the optical mouse unit 130, the selection between an eraser mode and a mouse operating mode may be triggered in response to an output of an orientation detection device 170 (e.g. a gyroscope).

Thus, a convenient and intuitive mouse function with additional stylus eraser function can be incorporated in a cap of a stylus without requiring additional mouse click buttons.

In other embodiments, the mouse function may be incorporated in a cap of a conventional ink pen.

Figure 7:
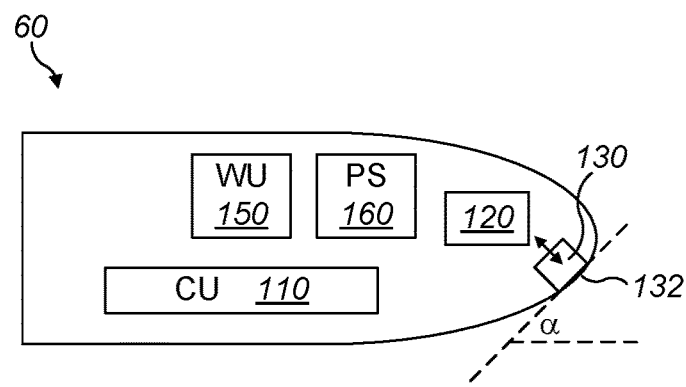
FIG. 7 is a schematic block diagram of an example cap with integrated mouse function for a pen-type device.

FIG. 7 is a schematic block diagram of an example cap 60 with integrated mouse function for the conventional ink pen.

Contrary to the respective caps 50, 52 of FIGS. 5 and 6, the cap 60 of FIG. 7 is configured for detachable mounting to a conventional pen-type device without typical stylus components that can be shared for implementing the mouse function. As a result, components such as the control unit (CU) 110, the wireless communication unit (WU) 150 and the power supply unit (PS) 160 are incorporated in the cap 60 together with the optical mouse unit 130 with or without integrated mouse click function and pressure sensor 120. Therefore, the above description of the respective components of the cap 50 of FIG. 5 (excluding the connecting portion 52) and the respective components of FIGS. 1 and 4 also applies to the cap 60 of FIG. 7.

In examples, angles of the surface of the cap 60 can be used to obtain a stable and plane detecting zone at the outer surface of the optical mouse unit 130 at the desired predetermined angle □□ for convenient and intuitive pen use.

In other embodiments, the optical mouse unit 130 may be a non-movable unit without integrated click button function. Then, at least one separate mouse click button may be provided on the surface of the cap 60 together with an optional stripe electrode for implementing a mouse scroll function.

Thus, a convenient and intuitive mouse function can be incorporated in a cap of a conventional ink pen or other non-electric pen-type device.

In other embodiments, the optical mouse unit 130 may be incorporated at an inclined or conical surface of a tip unit of a stylus.

Figure 8:
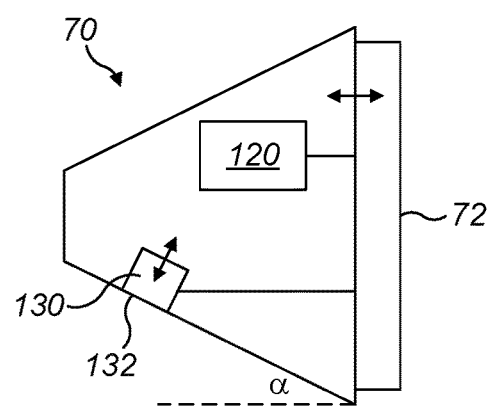
FIG. 8 is a schematic block diagram of an example tip unit with integrated mouse function for a stylus.

FIG. 8 is a schematic block diagram of an example tip unit 70 with integrated mouse function for a stylus (not shown).

In examples, the optical mouse unit 130 is placed in a replaceable tip unit 70 which is arranged so that when a user holds the stylus in a typical writing manner, his/her fingers contact the surface of the stylus behind the tip unit 70.

The tip unit 70 (which may comprise a writing tip (not shown)) can be detachably mounted to the front end of the stylus and is electrically connected to the internal components (e.g. control unit, power supply unit, wireless communication unit) of the stylus via a connecting portion 72 (e.g. an electrically conductive ring or patch or the like). The connection portion 72 may include the mounting mechanism for detachable mounting and may comprise several separated elements for respective different connections to different internal components of the stylus. The stylus already includes a battery/charging mechanism, a communication unit, a controller, a pressure sensor (may be for additional or all mouse buttons controls), which can be shared with the mouse function in a mouse operating mode.

In embodiments, the optical mouse unit 130 may be movable and may comprise an integrated button click functionality. Then, an additional pressure sensor 120 may be provided for detecting a mouse click. In alternative embodiments, buttons on the stylus housing may be shared for mouse click operations or a pressure sensor in the stylus may be shared for sensing a mouse click via the optical mouse unit 130.

As a further option in other embodiments, the optical mouse unit 130 may be fixedly incorporated to the tip unit 70 and the tip unit 70 may be movably connected to the stylus. Then, a mouse click activation can be detected by sensing a pressure applied to the whole tip unit 70 towards the stylus housing (e.g. at the connecting portion 72) when the user presses the upper surface region of the optical mouse unit 130 towards an underlying surface.

Similar to FIGS. 4 to 7, the optical mouse unit 130 can be integrated in an inclined portion of the surface of the housing of the tip unit 70 at a predetermined angle Q with respect to the non-inclined cylindrical side surface of the stylus housing. The predetermined angle Q may be selected so that the upper surface region 132 of the optical mouse unit 130 is arranged parallel to the surface of an underlying plane when a user holds the stylus with the attached tip unit 70 in a usual writing manner.

In other embodiments, the proposed conically shaped stylus tip unit 70 with optical mouse unit 130 at the predetermined angle Q could replace a conventional tip unit with writing tip and conventional inclination angle. Or, in alternative embodiments, a combined tip unit 70 with writing tip and optical mouse unit 130 could be configured so that the whole stylus with attached tip unit 70 can be rotated to use the mouse unit instead of the usual stylus writing tip. More specifically, the stylus could be rotated so that the upper surface region 132 of the mouse unit 130 faces an underlying surface when the stylus is used in a mouse operating mode.

Thus, a convenient and intuitive mouse function can be incorporated in a tip unit of a stylus without requiring additional mouse click buttons.

Hence, in some of the embodiments, a mouse function can be incorporated into pen-type devices without a need to add extra buttons for mouse click functions. The whole plane upper surface portion 132 of the optical mouse unit 130 can itself be used as a button which is pressed when a target location is reached, by pressing the whole stylus against the surface, which is a very intuitive gesture. In examples, the shape of the respective portion of the housing of the stylus or cap or tip unit can be designed with desired angles that will offer on one hand an intuitive writing posture and on the other hand an optical mouse unit 132 that can be placed closely (e.g. substantially hermetically) on the underlying surface.

With the cap- or tip-related embodiments the enhanced mouse function can be provided for conventional stylus or other pen-type devices (with minimal modifications) and offered separately as add-on or supplementary device.

In embodiments, a detector or detection function for the enhanced cap or tip unit may be provided, so that the stylus is automatically changed from the stylus operating mode to the mouse operating mode when the enhanced cap or tip unit is placed thereon.

The button or pressure sensor 120 for detecting the mouse click activation may be a fluid pressure force sensor, a resistive force sensor, a magnetic force sensor, or any other type of sensor that detects a force or pressure applied to the upper surface region 132 of the optical mouse unit 130 or the whole tip unit 70 and outputs a click command e.g. when a predetermined pressure or force has been exceeded. The signal output by the button or pressure sensor 120 may be a voltage, from which a capacitance or other parameter may be derived. Such a derived parameter may be a function of the detected force or pressure.

In examples, the stylus or cap or tip unit housing may be formed of a material suitable for enclosing the components described herein. The housing may be formed from, for example without limitation, plastic, rubber, metal, carbon fiber, etc. and/or any combinations thereof.

According to at least some of the above embodiments, attractiveness of usage of pen-type devices can be increased by indirect motivation of having an incorporated mouse-type input function which can advantageously be provided with simple add-on technology and shared use of existing components. The mouse click button(s) can be made superfluous since the intuitive handling posture of a pen allow to press the whole pen over the mouse detecting zone as a mouse click button.

To summarize, some embodiments relate to an apparatus and method that provide a structure and function to a pen-type device to enable usage of the device to perform operations similar to a computer mouse for a computing device. The structure may include an optical sensor, a portion of the optical sensor surface that can perform operations of a clickable button, and a structure to support a connection to the computing device.

It will be appreciated that the above embodiments have been described by way of example only.

More generally, according to one aspect disclosed herein, there is provided an apparatus for providing a mouse-type input functionality to a pen-type device, the apparatus comprising an integrated optical mouse unit for surface movement detection, a surface detecting zone, and a pressure sensing element for sensing a pressure or force applied to the surface detecting zone to detect a mouse click action.

In embodiments, the integrated optical mouse unit comprises the surface detecting zone for surface movement detection.

In embodiments, the apparatus further comprises a communication unit for transmitting information about a detected mouse click action and a detected surface movement to a host device of the pen-type device.

In embodiments, the optical mouse unit is movably supported and configured to act as a button for the mouse click action.

In embodiments, the optical mouse unit is integrated on a tapered housing portion so that an upper surface region of the optical mouse unit is arranged parallel to an underlying surface when a user holds the pen-type device in a writing position.

In embodiments, the optical mouse unit is arranged in a hole and surrounded by a ring button that surmounts a housing surface in order to act as a click button.

In embodiments, the ring button is configured to provide a mechanical acoustic click feedback.

In embodiments, a click button is arranged in close proximity to the optical mouse unit so that it is actuated by pressing the optical mouse unit towards an underlying surface.

In embodiments, the apparatus is configured to switch the pen-type device from a stylus operating mode to a mouse operating mode in response to an output from an orientation sensing device.

According to another aspect disclosed herein, there is provided a stylus comprising an apparatus of any embodiment disclosed herein, wherein the optical mouse unit is arranged at a back-end portion of the stylus.

According to another aspect disclosed herein, there is provided a cap for a pen-type device, comprising an apparatus of any embodiment disclosed herein.

In embodiments, the cap further comprises a connecting portion for connecting the optical mouse unit to a control unit of the pen-type device, wherein the pen-type device is a stylus.

In embodiments, the cap further comprises an erasure unit for the stylus.

According to another aspect disclosed herein, there is provided tip unit for a stylus, comprising an apparatus of any embodiment disclosed herein.

According to another aspect disclosed herein, there is provided an apparatus for providing a mouse-type input functionality to a pen-type device, the apparatus comprising an optical unit for surface movement detection, a surface detecting zone, and a mounting mechanism for allowing a releasable connection or detachable mounting of the apparatus to the pen-type input device.

In embodiments, the apparatus may be comprised in a cap or a tip unit of the pen-type input device. The mounting mechanism may be at least one of an insertion, fitting, fastening, engaging, and/or snapping mechanism, for detachable mounting to the pen-type device (which may be any handheld pen-shaped writing, reading or pointing device) in order to provide a convenient and intuitive mouse input function to the pen-type device.

According to another aspect disclosed herein, there is provided a method of providing a mouse-type input functionality to a pen-type device, the method comprising sensing a surface movement at a surface detecting zone of the pen-type device; sensing a pressure or force applied to the surface detecting zone; and triggering a mouse click function in response to the pressure or force sensing.

In embodiments, the surface movement is sensed at a surface detecting zone of an integrated optical mouse unit of the pen-type device.

According to another aspect disclosed herein, there is provided a computer program embodied on computer-readable storage and comprising code configured so as when run on one or more processors to perform the method of any embodiment disclosed herein.

Examples and embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system used for implementation. Accordingly, logical operations making up examples or embodiments described herein may be referred to variously as operations, steps, objects, or modules. Furthermore, it should be understood that logical operations may be performed in any order, adding and omitting as desired, unless explicitly claimed otherwise or a specific order is inherently necessitated by the claim language.

Other variants and applications of the disclosed techniques may become apparent to a person skilled in the art once given the present disclosure. The scope of the present disclosure is not limited by the above-described embodiments but only by the accompanying claims.

The invention claimed is:

1. An optical mouse comprising:
a cap configured to be mounted to a pen-type device, wherein the cap comprises:
a control unit;
a wireless communications unit configured to communicate with a host device; and
an apparatus operatively connected to the control unit and configured to provide a mouse-type input functionality, the apparatus comprising an integrated optical mouse unit configured to detect surface movement at a surface detecting zone.

2. The optical mouse of claim 1, wherein the pen-type device comprises at least one of an ink pen, a pencil, a non-electric pen-type device, an electric pen-type device, a pen-shaped scanner, a pointing device, a laser pointer, or a stylus.

3. The optical mouse of claim 1, wherein the cap is configured to be detachably mounted to the pen-type device.

4. The optical mouse of claim 1, wherein the apparatus of the cap further comprises a pressure sensing element configured to sense at least one of a pressure or force, applied to the surface detecting zone to detect a mouse click action.

5. The optical mouse of claim 1, wherein the cap comprises at least one of a mouse click button or a stripe electrode on a surface of the cap.

6. The optical mouse of claim 1, wherein the cap is configured to be mounted to a back-end portion of the pen-type device.

7. The optical mouse of claim 1, wherein the cap is configured to be mounted to at least one of a front end portion or a tip portion of the pen-type device.

8. The optical mouse of claim 1, wherein the cap is configured to be detachably mounted to the pen-type device using at least one of an insertion mechanism, a fitting mechanism, a fastening mechanism, an engaging mechanism, or a snapping mechanism.

9. The optical mouse of claim 1, wherein the cap further comprises a power source configured to provide electrical power to at least one of the control unit, the wireless communications unit, or the apparatus.

10. The optical mouse of claim 1, wherein the apparatus is configured to switch to a mouse operating mode in response to an output from an orientation sensing device.

11. A cap comprising:
a body configured to be mounted to a pen-type device;
a control unit;
a wireless communications unit configured to communicate with a host device; and
an apparatus operatively connected to the control unit and configured to provide a mouse-type input functionality, the apparatus comprising an integrated optical mouse unit configured to detect surface movement at a surface detecting zone.

12. The cap of claim 11, wherein the pen-type device comprises at least one of an ink pen, a pencil, a non-electric pen-type device, an electric pen-type device, a pen-shaped scanner, a pointing device, a laser pointer, or a stylus.

13. The cap of claim 11, wherein the body is configured to be releasably connected to the pen-type device.

14. The cap of claim 11, wherein the apparatus further comprises a pressure sensing element configured to sense at least one of a pressure or force, applied to the surface detecting zone to detect a mouse click action.

15. The cap of claim 11, further comprising at least one of a mouse click button or a stripe electrode on a surface of the body.

16. The cap of claim 11, wherein the body is configured to be mounted to at least one of a back-end portion, a front end portion, or a tip portion of the pen-type device.

17. The cap of claim 11, wherein the body is configured to be releasably connected to the pen-type device using at least one of an insertion mechanism, a fitting mechanism, a fastening mechanism, an engaging mechanism, or a snapping mechanism.

18. The cap of claim 11, further comprising a power source configured to provide electrical power to at least one of the control unit, the wireless communications unit, or the apparatus.

19. The cap of claim 11, wherein the apparatus is configured to switch to a mouse operating mode in response to an output from an orientation sensing device.

20. An optical mouse comprising:
a cap configured to be detachably mounted to at least one of an ink pen, a pencil, a non-electric pen-type device, an electric pen-type device, a pen-shaped scanner, a pointing device, a laser pointer, or a stylus, wherein the cap comprises:
a control unit;
a wireless communications unit configured to communicate with a host device; and
an apparatus operatively connected to the control unit and configured to provide a mouse-type input functionality, the apparatus comprising an integrated optical mouse unit configured to detect surface movement at a surface detecting zone.

* * * * *